US 8,978,993 B1

(12) United States Patent
Romero

(10) Patent No.: US 8,978,993 B1
(45) Date of Patent: Mar. 17, 2015

(54) THERMAL ACTIVATED COLD WATER DIVERSION VALVE

(71) Applicant: Bernabe Romero, Santa Fe, NM (US)

(72) Inventor: Bernabe Romero, Santa Fe, NM (US)

( * ) Notice: Subject to any disclaimer, the term of this patent is extended or adjusted under 35 U.S.C. 154(b) by 0 days.

(21) Appl. No.: 13/960,623

(22) Filed: Aug. 6, 2013

Related U.S. Application Data

(60) Provisional application No. 61/680,998, filed on Aug. 8, 2012.

(51) Int. Cl.
| | |
|---|---|
| G05D 23/08 | (2006.01) |
| G05D 23/275 | (2006.01) |
| G05D 23/02 | (2006.01) |
| G05D 7/01 | (2006.01) |
| B67D 3/00 | (2006.01) |

(52) U.S. Cl.
CPC ............... *G05D 7/0106* (2013.01); *B67D 3/00* (2013.01)
USPC .. 236/93 R; 236/91 R; 236/91 D; 236/101 A; 236/101 D

(58) Field of Classification Search
USPC .......... 236/12.11, 12.13, 12.14, 12.18, 12.19, 236/12.23, 91 F, 91 R, 91 D, 93 R, 97, 98, 236/99 F, 99 K, 100, 101 A, 101 D
See application file for complete search history.

(56) References Cited

U.S. PATENT DOCUMENTS

| | | | |
|---|---|---|---|
| 2,603,420 A * | 7/1952 | Tacchi | 236/12.18 |
| 4,945,942 A | 8/1990 | Lund | |
| 5,042,524 A | 8/1991 | Lund | |
| 5,193,780 A * | 3/1993 | Franklin | 251/68 |
| 5,277,219 A | 1/1994 | Lund | |
| 5,603,344 A | 2/1997 | Hall, Jr. | |
| 6,032,687 A * | 3/2000 | Linn | 137/337 |
| 6,219,859 B1 * | 4/2001 | Derakhshan | 4/677 |
| 6,588,377 B1 | 7/2003 | Leary et al. | |
| 7,707,665 B1 | 5/2010 | Hong | |
| 7,934,663 B2 | 5/2011 | Wilfords et al. | |
| 2009/0095356 A1 | 4/2009 | Greenthal et al. | |

* cited by examiner

*Primary Examiner* — Marc Norman
*Assistant Examiner* — Larry Furdge

(57) ABSTRACT

A device that directs cooled and otherwise wasted water to storage for reuse is disclosed. The valve incorporates a single flow stream through internal piping around a thermally sensitive coil which imparts rotation for automatic closing of a valve upon arrival of heated water to the valve. Once closed, the device resets itself for the next activation and use. The device is basically self contained and requires only single point installation. The unit provides for many households to experience substantial saving on daily energy and water expenses. The installation can be readily retrofitted to existing structures or incorporated in new construction whether any be homes, apartments, hotels, condominiums and businesses with water distribution requirements. Further, the present invention, requiring no external energy input, offers an alternative to expensive circulating hot water systems incorporating substantial initial cost and extended energy consumption.

13 Claims, 6 Drawing Sheets

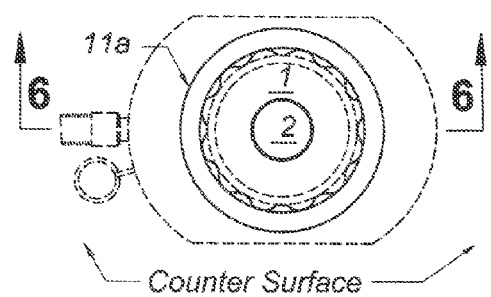
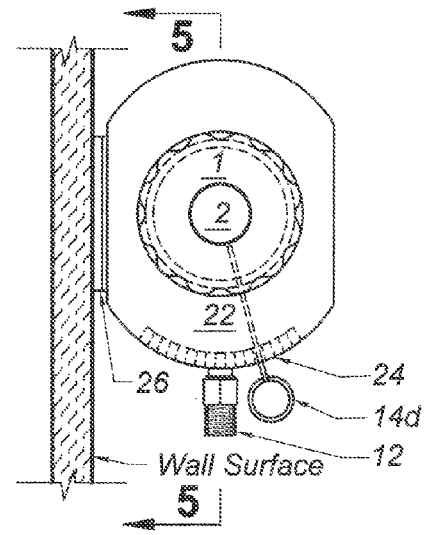
FIG. 1
FIG. 3
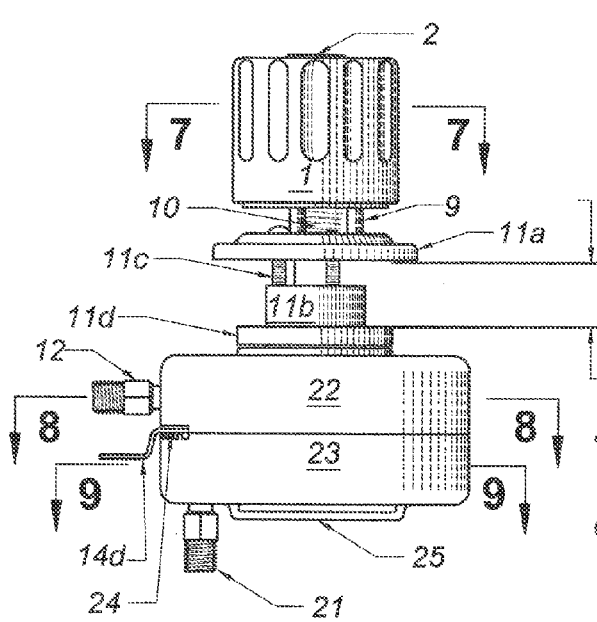
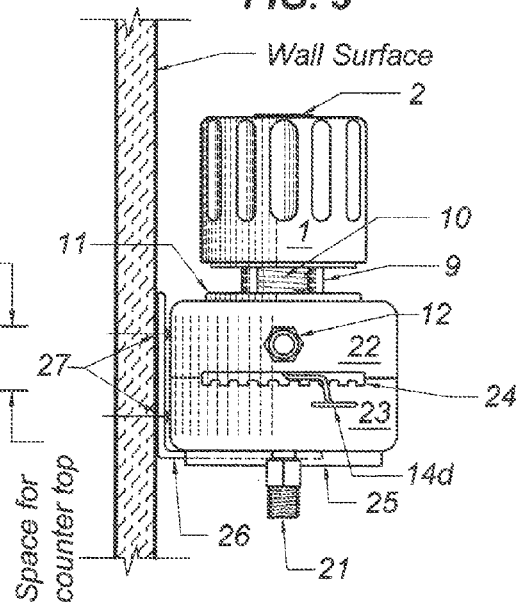
FIG. 2
FIG. 4
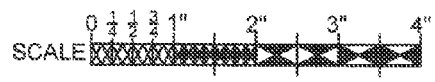

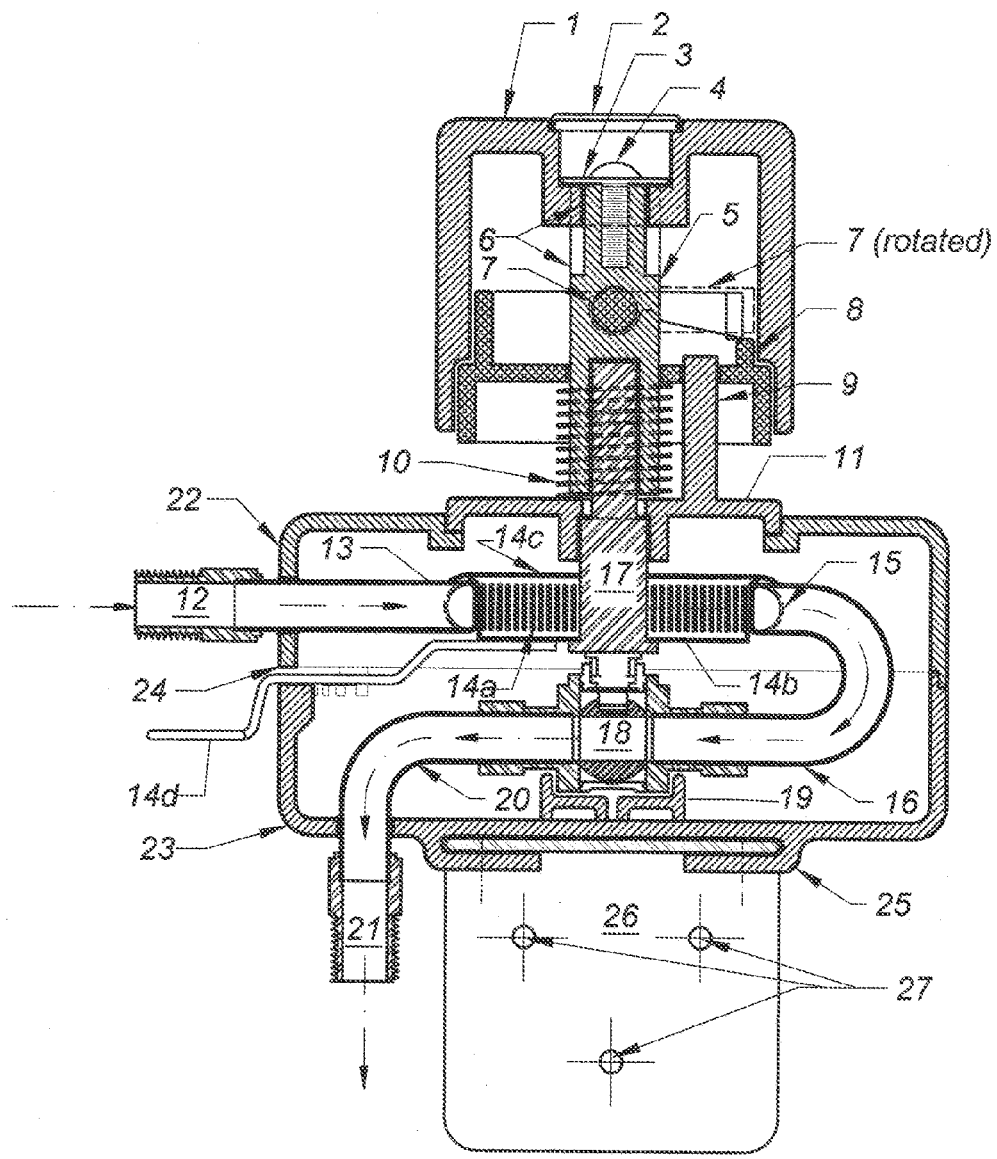
FIG. 5
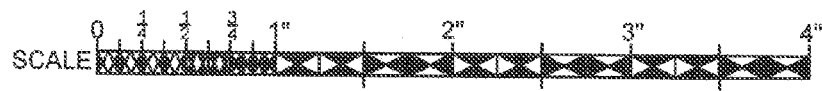

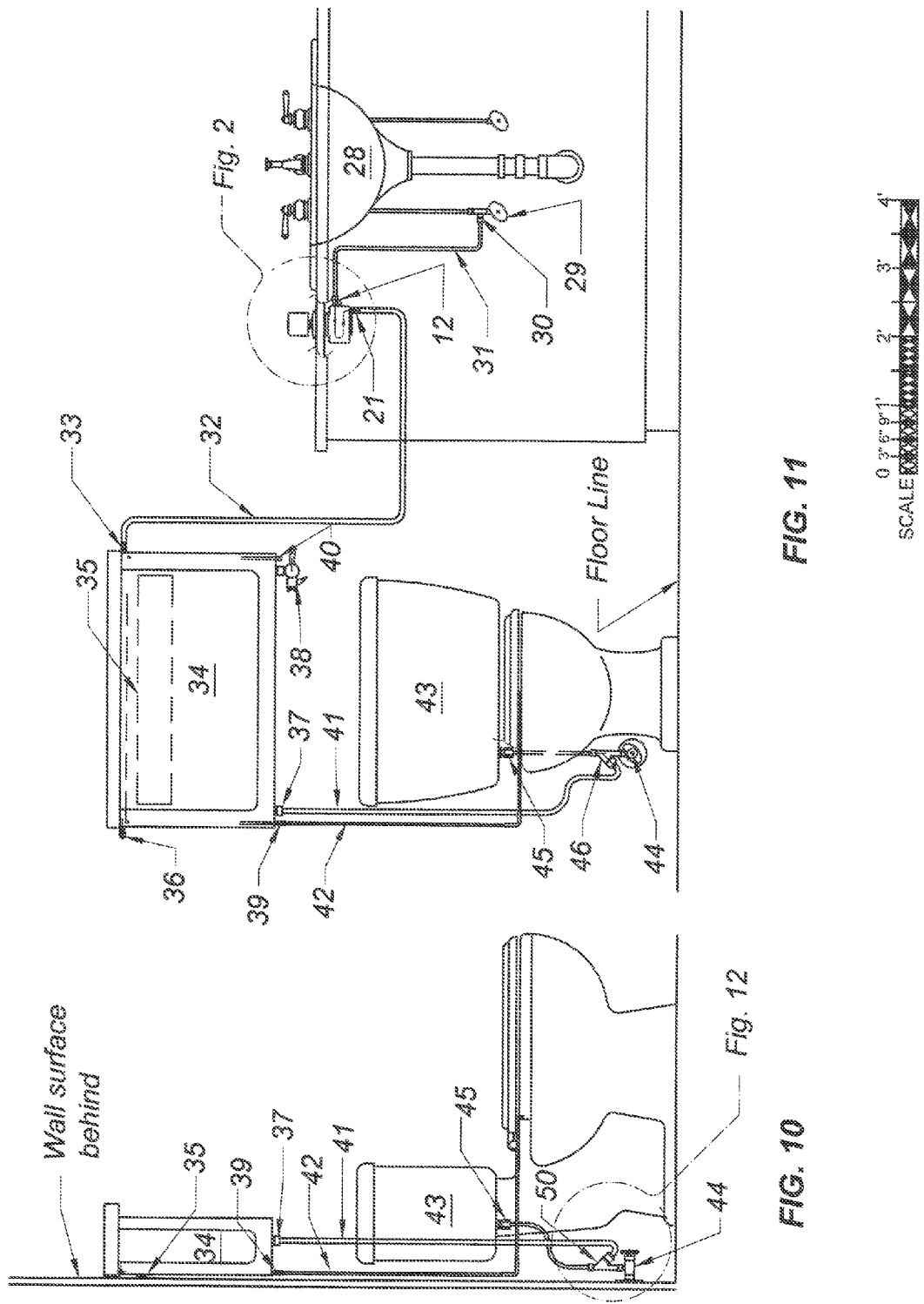

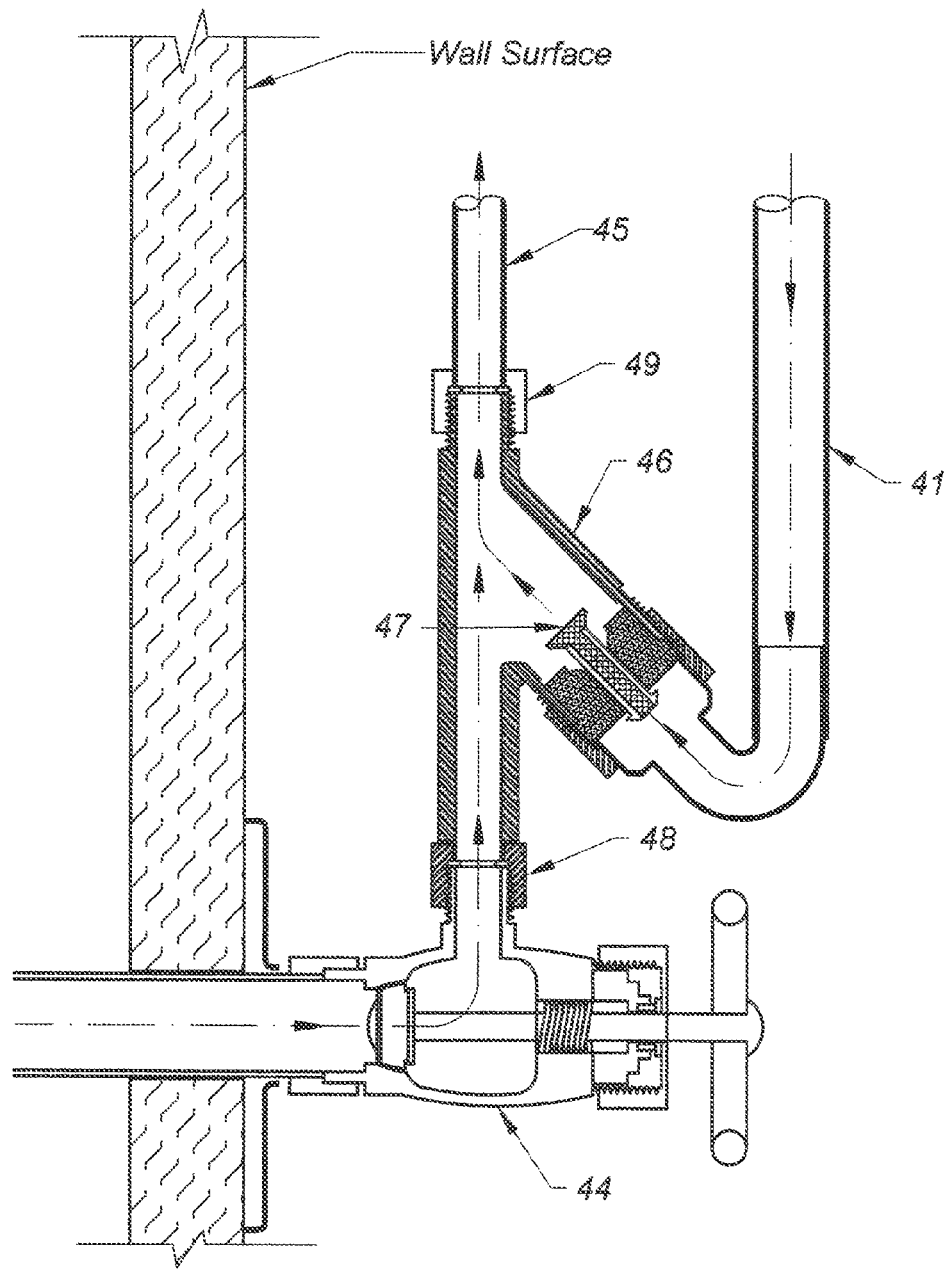
FIG. 12

THERMAL ACTIVATED COLD WATER DIVERSION VALVE

BACKGROUND OF THE INVENTION

1. Field of the Invention

This invention relates to the sad, daily reality that people, upon awakening, often turn on the hot water in the lavatory or shower and allow the cool lead water to run down the drain until the water is hot enough for use. Generally, this is water which has been standing in the delivery piping overnight and has cooled to ambient temperature. This problematic scenario is not only a morning ritual, but often occurs prior to an evening rite resulting from daytime cooling of the water due to non-use. The procedure causes the cooled water in the lines to be wasted at a rate of up to ten gallons a day per household. Statistics from 2005 research by the California Energy Commission show that US residents spent $10 billion a year waiting for hot water.

Some households, mostly in recently built homes, spend substantial initial and operating costs for electric powered recirculation pumps and dual piping within the hot water heating systems which keep hot water available for immediate use at the point of demand. Experts in the field agree that initial construction and materials and recurring operational and maintenance costs, along with energy costs, far outweigh the value of any water saved. Others, who are mindful of the occurring waste, use basic, often impractical, tedious trapping and storage methods which demand much dedicated, attention, time and effort.

The problem of the squandering of a very precious commodity is persistent and growing throughout and requires instant attention and resolution.

2. Description of Prior Art

There exist three-way fixed thermal diverter-valves, but these are generally for commercial and industrial use and are not conveniently user-friendly or conveniently operable. Existing three way thermal diverters do not shut off automatically and are still capable of wasting water if not attended to.

Review of prior art shows that the present invention, in its simplicity, differs substantially from several currently known prior art devices and systems aimed at resolving the same problem. In many cases, devises and systems in other prior art are generally complicated, incorporate many components and operational activity and in many cases require electrical power, controls and electronic monitoring. It is not apparent that any such device exists that does not require power or that is readily accessible to existing water systems for installation by home or facility owners.

Powered recirculation pump systems are generally installed in new homes by plumbers and mechanical contractors at significant expense. In contrast, the duality of the present invention is without doubt apparent in that it can be easily retrofitted in existing homes by minimally skilled homeowners at a very affordable cost. As a convenient alternative, the device can also be readily installed in new buildings with very little additional construction costs.

The Mutlund® Hot water demand system, (U.S. Pat. Nos. 5,277,219; 5,042,524; 4,945,942) requires the existence of circulating lines in order to be to installed in existing homes; adds piping, controllers, pumps, sensors and valves to the system at notable cost.

U.S. Pat. No. 7,934,663, Willsford et al. relates to a recovery system for standing water between the hot water heater and the shower and includes piping, a suction device or pump, mixer valves, storage tank, control valves, a Venturi (air streaming) device and extensive added piping. It is claimed that the system can be installed in new construction or retrofitted to existing conditions. With all the components involved, it likely that retrofit will be more difficult and expensive than that claim would anticipate.

The said recovery system's diversion valve consists of a sealed body with one inlet and two outlets and two chambers which are separated by a ceramic plate operated by a thermostatic wax filled cylinder with a piston which slides the plate over a matching fixed plate. Both plates have matching holes which direct water flow based on the sliding plate's position as influenced by the thermostatic piston. The valve also incorporates a diaphragm valve to direct the water flow in and out of the chambers. The diaphragm valve and piston work against a compression spring. All of the valve's components are subjected to exist submersed in the water flow and thus are exposed to being jammed by particles of residue within a less than pure water supply. Further, the valve has a small bypass opening between chambers which would likely allow slow constant flow to the storage component of the system where water waste could occur upon the tank's overflow. From the text of the invention claims, operation of the valve is dependent on opening the mixer valve at the lavatory which indicates that some cool water from the mixer will spill down the drain until the warm water arrives. Upon arrival of the hot water it seems that the mixer valve shut off is not automatic and needs to be turned off or further water waste will occur.

U.S. Pat. No. 7,707,665 B1, K. Hong, embodies a water conservation apparatus that incorporates a series of pipes and timed valves into a bellows reservoir for timely release into the cold water source by use of a water pump, regulators, valves and timing devices requiring electrical power supply. The disclosure of the invention suggests that water flow is diverted to the storage bellows by opening and closing up to 6 valves manually or electronically. There is no size scale indicated on the invention drawings so it is likely that the piping and valves are all indicated to be installed on or within the shower wall. The bellows reservoir is purported to hold as much as 10 gallons, hence weighing over 82 pounds and being 1.35 cubic ft. in size. Unless re-installing all piping within the wall and the reservoir mounted well up above the shower, much of the shower space is taken up by the system. Demolition, added piping, rebuilding and addition of power suggest that this installation can be quite expensive.

In the spirit of the present invention which is mounted at the inlet to the lavatory in the site of the shower, Patent Application Publication No. us 2009/0095356 A1, Greenthal et al. proposes a unitary valve block set between the faucet assembly and the hot and cold water inlet and connected to an accumulator with a pressure membrane which causes back-pressure on the cold water line once the accumulator begins to fill. This changes flow paths within the valve block which incorporates elements that are precisely sized to anticipated pressures and calculated flow rates, and consist of two large pressure actuated pistons and two in-line smaller pressure actuated pistons for each hot and cold water inlet, three pressure actuated check valves working against the pistons and ambient pressure along with a temperature actuated piston valve assembly which reacts to the introduction of hot water to the assembly and incorporates several pressure relief valves and O-ring seals.

Unlike the present invention, the valve block has many parts, seals, cavities and flow paths which suggest that manufacture of the unit will be complicated and expensive. Also the assembly's interior and parts are all in contact with the water and thus are disposed to being jammed by particles of residue within a less than pure water supply. This unit also seems to loose water upon initiation of the flow cycle.

U.S. Pat. No. 6,588,377, Leary et al., offers a diversion valve and a storage module mounted in the cavity below the lavatory. The system is connected at the hot water inlet to the lavatory faucet as is the case in the present invention. The system converts energy by routing unused hot water back to the water heater between uses. It uses a capture and hold tank which is partially filled with phase change gas. Pressure sensors open or close the diverter valve moving cold water into the upper chamber of the tank. The tank gas is expanded or retracted via use of a heat exchanger using a processor controlling temperature and pressure changes. The change in pressure forces water back to the water heater via a dedicated line. Indications from the configuration of the system are that a second tank is anticipated to capture excess water and return it to the existing water heater, hence adding piping to the system.

U.S. Pat. No. 5,603,344, Hall Jr., defines an apparatus for recovery of cooled water uses an interior hydraulic motor and adjustable thermostatic control to pump the cooled water to a cold water pipe leading to storage. Pumping begins when the hot tap is turned on and stops when hot water reaches the apparatus; the cooled water flow is split, a portion moving through the pump and the other portion connecting to the cold water side; an initial 25% flow of water used to accommodate the pumping escapes, saving only the remaining 75% into the cold water system. The unit is self contained and houses both hot and cold water to the faucets. This allows internal transfer of the cooled hot water to the cold water supply. Justification for the water loss rests with the otherwise expensive installation and use of electrical power to the pump. As is the case with other devices, the valve's components are subjected to the water flow, thus are disposed to being jammed by particles of residue within a less than pure water supply.

SUMMARY OF THE INVENTION

The primary objective of the present invention is saving for reuse significant water amounts now flowing down the drain while people await hot water to arrive to the bathroom or other point of use, causing an inordinate amount of waste.

An important objective is to instill in the mind of the potential user the desire to save money and to contribute to global efforts to minimize waste of a precious resource by making the device very accessible, user friendly, attractive easy to install, easy to use and requiring very little attention. The present invention has very few components and moving parts and there are no electrical connections or batteries required.

Another objective is to provide to the householder, multi-family dwelling owners and other buildings and facilities the opportunity to retrofit the device into existing facilities at very low cost and effort, resulting in effective, simple and convenient installations.

Further, an objective of the invention is to provide a viable alternative to what are substantial initial costs in new construction for circulating hot-water-on-demand systems which call for essentially doubling the length of associated main hot water lines, installation of pumps, valves and timers; such installations serving mainly to making hot water available for immediate use while not being successful in compared water saving efforts at which the present invention is aimed.

The present invention requires the introduction of vessels for storing the rescued water. The householder can furnish his or her own storage vessel, such being localized tote buckets, outside rain barrels, cisterns, a counter top storage unit with spigot for domestic use or a system which would return the water to a storage tank mounted above the existing water heater for introduction back into the hot water system. The present invention provides, as part of the embodiment of a water rescue system described herein, an effective and simple method of storage to localized over-the-tank-storage for use in toilet flushing.

This present invention, designed to be conveniently mounted along side the lavatory or on the lavatory countertop, is easily connected under the lavatory at the hot water tap ahead of the hot water line to the lavatory faucet; is turned on manually and diverts the cool lead water to a designated storage vessel; and when hot water from the water heater reaches the valve, incorporating within, a thermostatic device set at a predetermined temperature, said valve automatically shuts the water flow having made hot water available to the lavatory and shower without wasting any water along the way. Further, the operation does not rely on any interaction with the cold water side of the faucet set. Once the operation has started, water flow can be stopped at any time, for any reason, by simply manually returning the knob to its original position. The knob in the original position will close a ball valve aligned with said knob and disallow water flow to continue.

Beyond use by single households, the device can provide water savings for multi-family units, hotels, resort facilities, and office building not usually requiring extensive water use. Existing older apartment buildings, not having circulating hot water on-demand systems, can be readily retrofitted with flow from all units to centralized storage accordingly.

High water use businesses like spas, barber shops and beauty solons are potential candidates for this water valve and storage system.

The concepts in this invention may be expanded to industries dealing with flow such as liquid commodities and the pharmaceutical industry.

BRIEF DESCRIPTION OF THE DRAWINGS

FIG. 1—Plan View; Countertop Installation
FIG. 2—Elevation; Front View of Countertop Valve
FIG. 3—Plan View; Wall Mounted Installation
FIG. 4—Elevation; Side View of Wall Mounted Installation
FIG. 5—Cross Section; Wall Mounted Unit
FIG. 6—Cross Section; Countertop Installed Unit
FIG. 7—Plan Section; through Press and Turn Knob and Sleeve
FIG. 8—Plan Section; through Split Ring Tube and Thermostatic Coil Assembly
FIG. 9—Plan Section; through Ball Valve
FIG. 10—Side View; Wall Mounted Over-toilet reservoir and Connections
FIG. 11—Front View; Countertop Valve Connections, Wall Mounted Over-toilet Storage
FIG. 12—Cross Section of a Three-way Valve at the Existing Toilet Tank Supply inlet

DETAILED DESCRIPTION OF THE INVENTION

Thermal Activated Cold Water Diversion Valve

Figure 7:
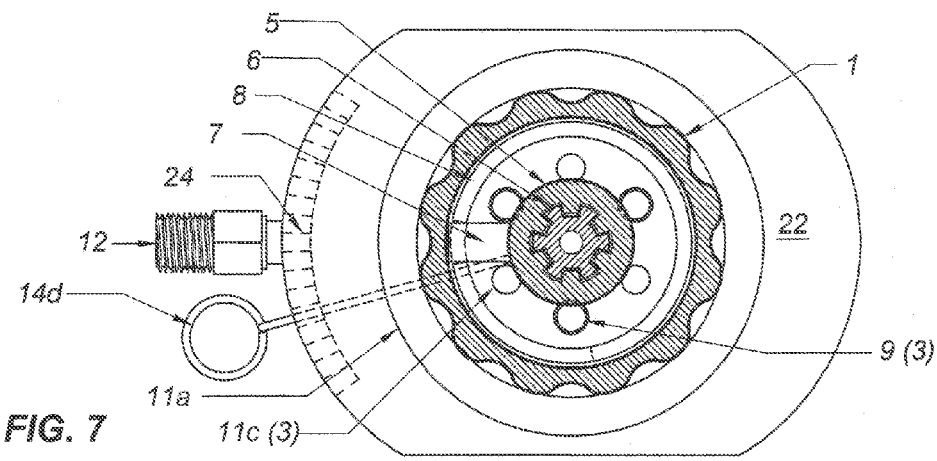

The Press and Turn Knob 1 has a Cover Plate 2 which upon being removed allows access to the Stop Washer 3 and Machine Screw 4 which keep the Press and Turn Knob 1 vertically engaged with the Sleeve 5 while Matching Grooves 6 in Sleeve 5 and Knob 1 allow free vertical movement of the knob but provide secure engagement for mutual rotation. (FIG. 7)

Activation of the Press and Turn Knob 1 counterclockwise will move the Post Keeper 8 down against the Compression Spring 10 causing the release of Extension Post 7; thus allowing engaged Sleeve 5 and Brass Valve Stem 17 (having corresponding square cross-sections) to rotate together and force open Ball Valve 18 thus initiating water flow from Water Inlet 12 into the said diversion valve. Vertical Keeper Guides 9 allow only vertical movement of the Post Keeper 8. Once disengaged from the retaining slot in the Keeper Post 8, Extension Post 7 rotates with Sleeve 5 and rests atop the varying height outer rails of Post Keeper 8 which maintains contact due to the vertical pressure from the Compression Spring 10.

Figure 8:
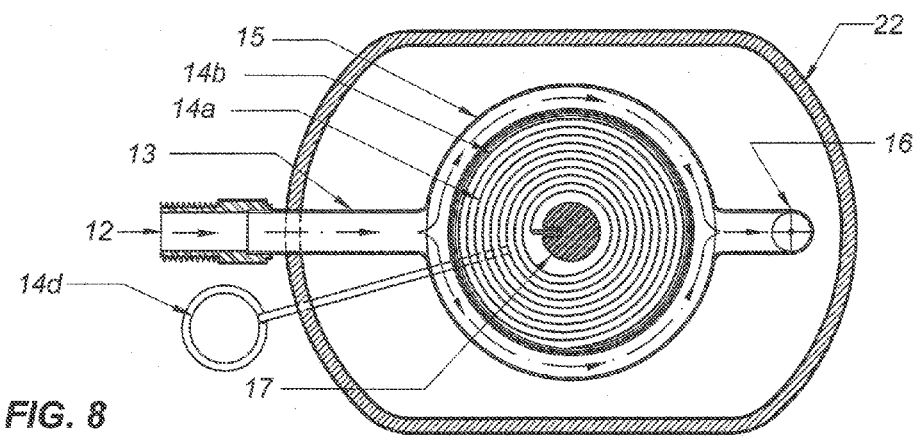
Figure 9:
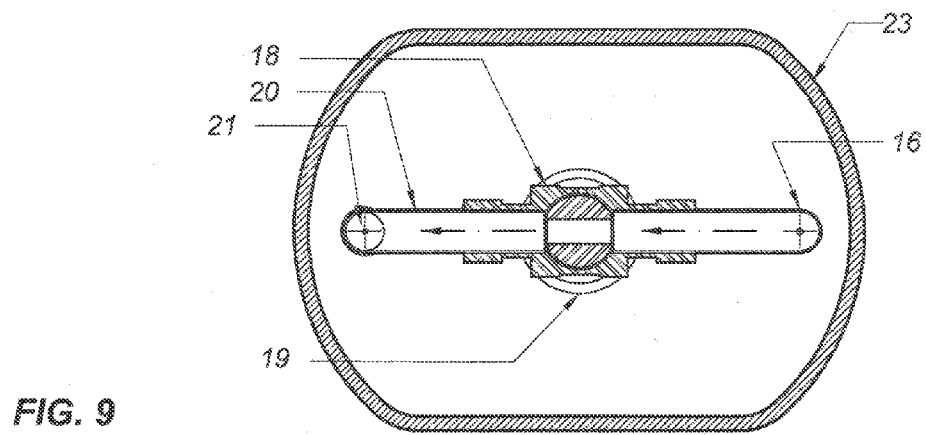

Lead water, which has cooled within the piping, flows into the Water Inlet 12 through Inlet Connecting Tube 13 into the Split Flow Tube Ring 15 (which surrounds Thermostatic Coil Assembly 14) (FIG. 8), then flows on through the Valve Connecting Tube 16 into the open Ball Valve 18, then on through the Outlet Connecting Tube 20 (FIG. 9) and out Water Outlet 21 into piping directed into the user's selected storage. Ball Valve 18 is held rigidly in-place by means of the Valve Alignment Seat 19 maintaining axial alignment.

Water in the Split Flow Tube Ring 15 arriving from the water heater will continue to flow and the increasing temperature of the water will transfer its heat through the Coil Container Cup 14b causing the dissimilar metal Thermostatic Actuating Coil 14a to begin expansion and consequent rotation from increased thermal pressure; thus simultaneously causing clockwise rotation of the engaged Brass Valve Stem 17/Sleeve 5. The Thermal Actuating Coil 14a is contained in a Coil Container Cup 14b, and capped by a Cover Plate 14c to help retain the heat. The Temperature Adjustment Lever 14d is attached to the Coil Container Cup 14b in order to vary resistance to the coil for correlation of flow with desired water temperature. The rotation also causes Extension Post 7, connected to Sleeve 5, to work back against the Post Keeper 8 and Compression Spring 10 until it is seated in a restraining slot in the outer rail of Post Keeper 8 where it sat at the initiation of the procedure while, at the same time also bringing the Press and Turn Knob 1 back to its initial position, ready for the next activation.

Simultaneously, the rotary motion caused by rising temperature brings about the closing of Ball Valve 18 thus stopping water flow and having hot water now in place at the point of use.

Figure 6:
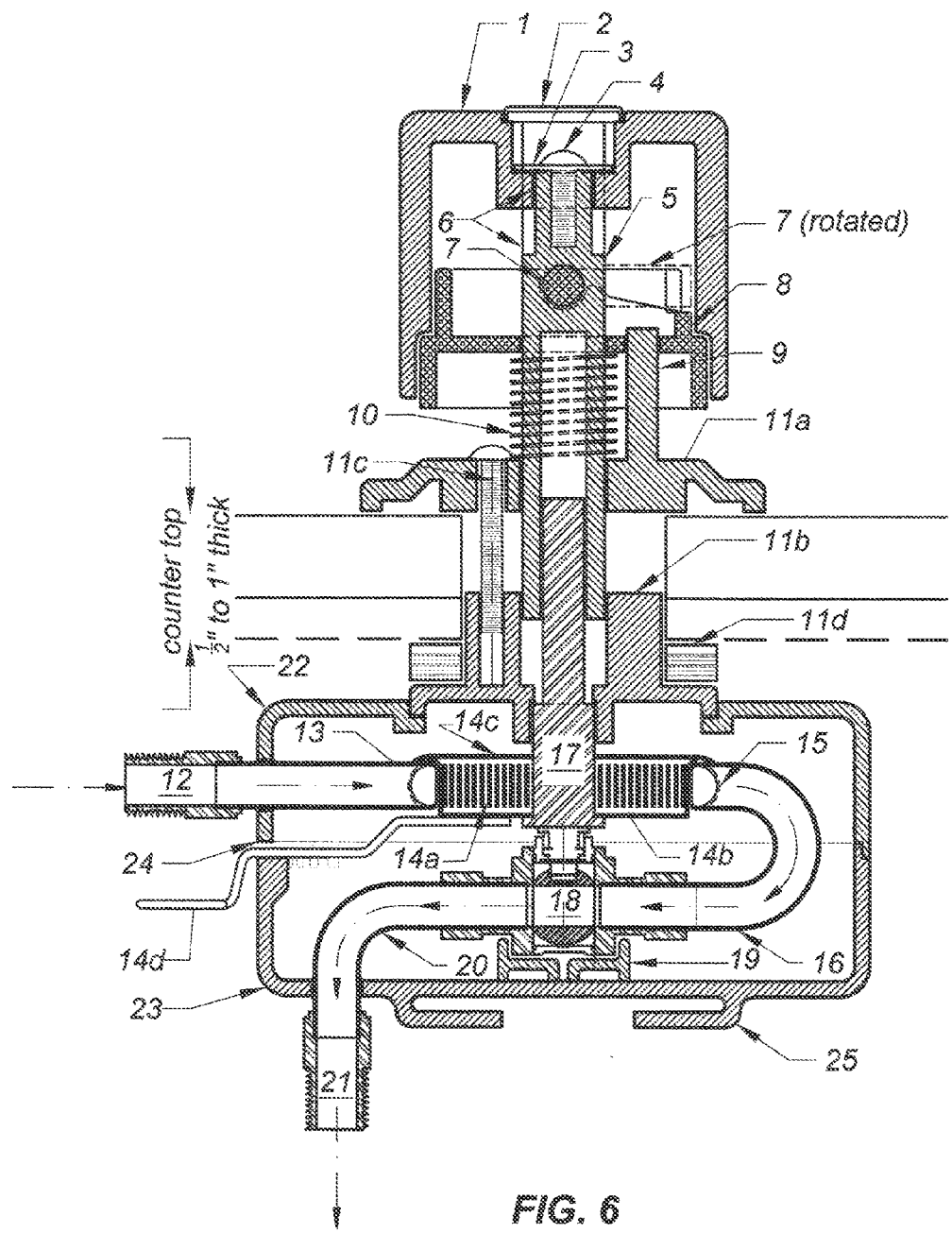

The Escutcheon Plate Assemblies 11, which vary in design, form the connection between the knob, sleeve and valve. The Escutcheon Plate 11 for the Wall Mounted Unit (FIG. 4 and FIG. 5) is singly self contained. However, in the case of the Countertop Mounting Unit (FIG. 2 and FIG. 6) the escutcheon is comprised of 4 separate parts necessary to facilitate clamping of the unit into the bored countertop hole comprised of the Outer Escutcheon Plate 11a, Inner Escutcheon Plate 11b and 3 each Machine Screws 11c. Shim 11d is to adjust for a thinner countertop if required.

The entire diversion valve, save the actuation knob, is contained in an enclosure consisting of the Upper Enclosure Body 22 half and Lower Enclosure Body 23 half. Along the Upper and Lower Enclosure Bodies 22 and 23 meeting edges, at the inlet side, there is a slot with a serrated bottom edge to form Adjustment Lever Notches 24 to provide for affixing the manual Temperature Adjustment Lever 14d at varied positions. At the base of the lower Enclosure Body 23 there is set a Valve Alignment Seat 19 which keeps the Ball Valve 18 rigid and aligned for smooth rotation and operation. In the present design of the Enclosure Bodies 22 and 23, the front and back faces are flattened and thus are interchangeable to allow for mounting against the wall with the Water Inlet 12 coming from either side depending on the direction of the water source.

Lastly, Wall Angle Rails 25 are molded with the Enclosure Body 23 half and designed to receive a stainless steel Wall Angle 26 flange. One flange of The Wall Angle 26 is secured to the wall with stainless steel Angle Mounting Screws 27 necessary for the wall mounted Device. Securing the rail to the flange is done with metal set-screws.

Reservoir for Recovered Water from Diversion Valve

Storage of diverted water can be accomplished with a varied amount of choices on the part of the householder installing this present invention. To illustrate the relationship between the installed Thermal Activated Cold Water Diversion Valve and the optional Water Storage Reservoir designed specifically to embody a complete installation, there is shown (FIG. 11) a typical Existing Lavatory 28 on a countertop which shows the existing lavatory faucet Hot Water Tap 29 to which a 3-way Tee Insert 30 is installed. A water Inlet line 31 from the tee attaches to the Diversion Valve Inlet 12. Water flows through the Diversion Valve to Outlet 21 where it is directed through the line from Outlet Line 32 to Reservoir Inlet 33 into a Water Reservoir 34 (a molded 5 to 7 gallon capacity container capped with a rigid formed combination shelf/lid) which is wall attached by the Wall Mount 35 over the Existing Toilet Tank 43. Another Reservoir Inlet 36 is provided opposite Reservoir Inlet 33 to provide for an alternate left side feed from the existing lavatory. Reservoir Outlets 37 and 38 also are provided on both sides for connection to the Outlet Line from Reservoir 41 based on the existing flush line inlet being to the left or right side. (The not-connected outlet is fitted with a Spigot for drawing water from the reservoir at will. Note that the water is still potable as it has not left the system.) Water is then directed toward a One-way Valve 46 which is inserted between the Existing Water Tap 44 and the Existing Water Tank Inlet 45. Overflow Outlets 39 and 40 are provided to the left and right on the underside of the tank for connection to the Overflow Line 42 to the Toilet Bowl. The unused outlet is capped. The overflow outlet is designed to set to the rear of the toilet and empty into bowl should the reservoir become full.

The existing water supply (FIG. 12), being disconnected from the toilet tank, a One-way Valve 46 is inserted using a New Tap Connector 48 at the Existing Water Tap 44 and New Line Connector 49 is re-connected to the Existing Water Tank Inlet 45. The One-way Valve 46 Insert is fitted with a Pressure Activated Stopper 47 which disallows flow against the Outlet Line B 41 from the Reservoir 34.

How the Invention Works

General—Thermal Activated Cold Water Diversion Valve

The device, upon activation, diverts the cooled water in the hot water lines for capture in a remote storage vessel. The unit is a self contained diversion valve opened manually and closed automatically by the transfer of heat; it has no electrical connections or batteries. The practical and attractively designed valve comes assembled, fits in the palm of one's hand and is easily installed on a bathroom wall or through the lavatory countertop. A wall bracket is provided for wall installation while installation on the counter requires boring through the counter top. Both installations secure the subject valve in the bathroom within convenient reach of the lavatory. Connection is made under the bathroom lavatory by removing the hot water faucet connector hose from the tap, inserting a 3-way tee, reconnecting the hose to the tee and connecting a new hose from the tee to the new diversion valve at the inlet side. Another hose is connected from the valve outlet to the water storage vessel. Done! Cost of the valve and installation is very affordable and installation requires minimal plumbing knowledge or experience and can be accomplished by other than trained plumbing technicians.

Storage alternatives for the recovered water from the diversion valve are quite varied. The user may provide a localized container such as a bucket which can be toted away for use in other areas or could provide for directing the flow to an exterior container, such as a rain barrel or cistern. Another concept is to divert the water to a storage tank located over the existing hot water heater and connect it to the incoming water line through a check valve.

The present invention includes the embodiment of a wall mounted reservoir set over a nearby toilet in the same bathroom for storage of the recovered water.

General—Reservoir for Recovered Cold Water from Diversion Valve

The water from the diversion valve is dispensed into the reservoir for storage and used when toilet flushing is activated. The location of the reservoir over the toilet tank provides gravity flow through the flow line which is of a greater diameter than the water tap line into the tank; a one-way tee is connected and is such that the flow from the reservoir forces the plunger open; together, these features partially override the normal tap pressure hence allowing the stored water to flow into the toilet tank.

Operation—Thermal Activated Cold Water Diversion Valve

The diversion valve, once installed, is normally "off" with the knob secured, the valve closed and the inlet side charged with water which has cooled over time as has the entire hot water line from the water heater. The also-cooled thermostatic coil, affixed to the valve stem, is in the contracted state and has the predisposition to open the valve, but is restrained from turning by an internal keeper until such time as the system is activated.

To activate, one presses knob 1 down and turns it counter-clockwise; and it in turn presses the post keeper 8 down against the compression spring 10 releasing extension post 7, thus allowing post 7, sleeve 5 and stem 17 to rotate and simultaneously open ball valve 18. (Note that the required rotation is only one quarter turn.)

Water flows from the inlet 12 through the split flow tube ring 15 and on through the ball valve 18 and out the outlet 21 through the line to the selected storage. Water will continue to flow and increasing temperature from the water in the split flow tube ring 15 will cause the thermostatic actuating coil 14a to expand once it reaches the preset operating temperature range, resulting in increased rotary pressure of the coil causing rotation of the valve stem 17; the increased pressure also causes extension post 7 to rotate back clockwise until the post is seated in a preset restraining slot along the edge of post keeper 8. As the temperature rises and, causes the stem rotation, it simultaneously closes ball valve 18 thus automatically stopping further water flow. The coil assembly is provided with a manual temperature adjustment 14d to more closely and more accurately correlate flow rate and operational temperature range of the unit.

Following the operational cycle, the lead cooled water has been stored, the valve automatically turns itself off and hot water has reached the location of both the lavatory and shower and both are now ready for use. No water waste has occurred.

The design and composition of dissimilar metals, the width and thickness, the characteristic interaction of the metals of the thermostatic coil which turns the valve stem will require certain water temperature set-points. These are a function of engineered design for the thermostatic coil and are foreseen as being somewhere between 60 and 100 degrees Fahrenheit based on the choice of materials and configuration of the coil.

Operation—Reservoir for Recovered Cold Water from Valve

Diverted water via outlet line 32 from the diversion valve outlet 21 enters the reservoir inlet 33* or 36* and spills into the recovered water reservoir 34 which is secured to the wall above the existing Toilet Tank 43 on a metal bracket. Overflow ports are built into the reservoir near the top and open out the bottom of the unit at overflow outlets 39* or 40*. Overflow line 42 spills into the toilet bowl or may be directed to a smaller container, avoiding floor spills. Reservoir outlets 37* and 38* are provided at the bottom of the reservoir to one of which outlet line 41 is connected and flows to one-way valve 46 connected to the existing water tap 44 using a new tap connection 48 which displaces the original connection to the existing water tank inlet 45. A new line connection 49 at the outlet of the one-way valve 46 receives the existing water tank inlet 45. Combined, gravity from the reservoir, the larger diameter of the flow line and the configuration of the one-way valve will override the pressure from the tap. This allows the stored water to be used at a faster rate. Pressure can be adjusted by partially closing the tap faucet.

* The reservoir inlets and outlets are provided on both sides to allow for location of the lavatory on either side of the toilet. The unused outlets are capped.

How to Make the Invention:

Thermal Activated Cold Water Diversion Valve

The proposed diversion valve is made using proven existing technology, material and methods. Its components can be constructed by existing manufacturers with little change in their existing setups. Assembly can take place at another location once the parts are manufactured and delivered.

Primarily, the ball valve 18 is of standard brass and/or bronze factory construction, with neoprene seals and if necessary treated internally for smooth operation. Only the metal valve turning stem 17 would be a specialty, different from most factory standards, but can be easily machined from standard metals to accommodate the unit configuration.

The sleeve 5, the extension post 7, post keeper 8, escutcheon assemblies 11 and alignment seat 19 can be molded in fiberglass and/or of plastic injection molding.

The exposed to view knob 1 and the device body 22 and 23, escutcheon 11 plus associated other parts can be coated in a metallic, baked enamel or ceramic finish to match popular bathroom trim and can be made of either formed metal or injection molded plastic, either materials using familiar bathroom fixture manufacturing techniques. The body enclosures are primarily cylindrical, but in simple form are flattened on the front and back in order to allow for alternate wall mounting on either face depending on the direction from which the inlet is fed. For countertop mounting, the body is not exposed to view. For exposed to view installations, the body lends itself to variable aesthetic designs, finishes and colors to match local decor and other bathroom fixture designs.

The thermostatic unit 14 can be the product of one or more manufacturers who make a variety of metal parts. The coil container cup 14b and coil cover plate 14c are of stamped brass or copper and the temperature adjustment lever 14d is of brass or stainless steel. The dissimilar metal thermostatic actuating coil 14a is the product of manufacturers of thermostatic products having a variety of configurations, strengths and sizes. Operating characteristics of the coil can be closely engineered to correspond to the desired water temperature for the unit. The engineered design for dissimilar metal selection and their physical characteristics and interaction, along with the width, thickness, and the number of turns will result in certain accurate water temperature set-points in the area of 60 to 100 degrees. Further manual adjustment to desired operational temperatures by the user is provided in the unit's design.

Connecting tubes 13, 16 and 20 along with split flow tube ring 15 are of extruded brass or copper piping joined by standard solder, welding or other proven methods and techniques to assure water tight connections.

The connections for the tee inserts 30 and 46 are to be stainless steel or chrome plate threaded cap and nipple compatible with the existing connectors to which they are inserted.

Valve Inlet 12 and valve outlet 21 are shown on the drawings as standard threaded cap and nipple of plated brass or stainless steel. However, as an alternate for easier consumer installation, these connections can be annular ringed slip-on pressure connections associated with plastic tubing.

Connecting tubing for water flow is compatible flexible plastic tubing, white or clear, with size and wall thickness suited to the water pressure and flow rate at the installation. It is anticipated that the diameters would be in the range of ¼" to ⅜".

The valve unit configuration for most of the components is cylindrical. This is because the motion of the unit occurs about a single vertical axis. The knob, sleeve, post keeper, spring, escutcheon components, thermostatic assembly and base of the stem are primarily of cylindrical plan form. The upper portion of the valve stem along with the matching sleeve hollow, have a square cross section which provides for engagement for tight fit and simultaneous rotation.

All elements shown are necessary. Some parts, shown as separate, such as the valve alignment seat which could, for the ease of manufacture, be integrated with the body configuration for ease of manufacture or operation. Likewise, with some study, some of the escutcheon assembly parts could be formed together, also in the interest of ease of manufacture.

It is important that the split ring tube and the coil are separate so that the thermostatic coil remains dry and free of water calcium deposits which could interrupt its operation. The body design will include ventilation to avoid condensation build-up.

Regarding the final configuration of the unit, the locations of the valve and the thermostatic unit could be interchanged, but this would require penetrations above and below the ball valve, thus creating a point for potential leaks. Also, the two parts could be inline, but a moving connection would have to be made between the two.

A configuration having the water run through the unit interior, submersing of parts would not be desirable. Keeping any water flow away from the thermostatic unit is very necessary.

Reconfiguring from a ball valve to another pressure seal valve would require introducing more turning motion in lieu of the minimal quarter turn in the ball valve.

Use of a "bellow" thermostat and piston can be made to work, but the coil thermostat better fits the axial configuration and operation of the unit.

Reservoir for Recovered Cold Water from Diversion Valve

All technologies exist for making the reservoir and all its parts. The body will be molded of plastic used to make containers, probably through use of injection molding. Tubing and plumbing connectors will be of standard materials and designs adapted to the needs. Structural considerations are to be incorporated to assure durability and rigidity of the reservoir and mounts, and strength of the materials and connections.

The one-way valve tee insert incorporates known check valve flow technology, using standard materials of brass, copper or bronze and will have finishes suitable to the installation and its surroundings.

How to Use the Invention:

Prior to using the shower or lavatory depress and turn the knob in a counterclockwise motion. Wait but a few of minutes and the knob will automatically turn back clockwise and water flow will cease. During the flow, it may be advisable that one should be present should anything prevent the valve from fully closing or if your storage vessel begins to overflow. Action required would simply be turning the valve clockwise to the off position. Following normal operation of the unit, you may now turn on the faucet or shower because the desired temperature has been reached. One should adopt water saving habits while brushing, shaving or showering. The householder can furnish his own storage vessel or alternate methods of storage to include either the over-the-tank-storage featured herein for use in toilet flushing; a counter top storage unit with spigot for domestic use; or a system which would return the water to a storage tank above the water heater.

Additionally, with further research and technological consideration, computer technology may find its way into this device for operations at programmed times, monitoring of water use, flow rate and temperature of the water; initially, this is not a requirement or feature of the present invention.

The device is generally designed for retrofit into existing homes. With substantial ease; however, it is also very well suited to new construction and could be augmented with a variety of storage options, including returning the water to the water heater. The small amount of additional water piping required with this device can effectively be concealed in the new construction.

The device is well suited to installation in hotels, motels, apartments, condos or other multi-family facilities.

This concept may also be adapted to the food industry dealing with liquids or soups, the pharmaceutical industry and heating and cooling systems in other applications.

What is claimed:

1. A water recovery device for diverting and storing water from a hot water delivery line comprising:
    a manually activated knob to initiate within the water delivery device a flow of a stream of water from the hot water delivery line into an internal metal tube in the water delivery device; and
    next into an internal split metal tube surrounding a thermal sensitive bimetallic coil, the bimetallic coil automatically activates, upon the arrival of heated water from the hot water delivery line, an internal ball valve, wherein the split metal tube maintains the water stream within the confines of the tubing, avoiding unnecessary water contact with the thermostatic coil;
    resulting in protection of said critical moving parts of the thermostatic coil from being jammed by any calcium-like impurities which may exist in the water stream;
    further, the stream of water flows through the internal ball valve and out to a reservoir to receive and hold the diverted water for later use; and
    said ball valve rotates interactively from the action of the bimetallic coil to close the stream of water upon heated water reaching a predetermined temperature without having wasted any water along the process.

2. The water recovery device according to claim 1, wherein the water recovery device includes an inlet and an outlet to allow passage of the water through the device on toward a designated storage vessel.

3. The water recovery device according to claim 1, which further includes the use of the bimetallic coil with preset temperature settings which respond to heat transfer from the hot water in the system or to ambient cooling; and creates rotational pressure onto a valve stem causing the internal ball valve to close once it has fully been activated and automatically resets itself for the next reactivation.

4. The water recovery device according to claim 1, wherein the knob, bimetallic coil and internal ball valve are aligned axially resulting in rotational motion within the device.

5. The water recovery device according to claim 1, wherein the water recovery device is designed for connection at only one point in the existing hot water tap at a lavatory or sink, making it suitable for installation into new or existing construction with little plumbing knowledge or effort.

6. The water recovery device according to claim 4, wherein the water recovery device has built-in pre-set accuracy in the temperature design limits of the activated coil along with the ability for manual adjustment to adapt to the temperature of the heated water which reaches the internal ball valve.

7. The water recovery device according to claim 4, wherein the internal ball valve allows the flow of the stream in response to the manual activation and which constrains and stops flow of the stream in response of the action of the thermostatic coil.

8. The water recovery device according to claim 4, wherein said rotational motion is confined within one quarter full turn in two directions about a single axis.

9. The water recovery device according to claim 1, wherein the water recovery device confines the entire automatic process of the flow and heat exchange within the confines of the device requiring no electrical or outside influences except the initial press and turn action which puts the process in motion; and which reversal of said motion will immediately stop the process.

10. The water recovery device according to claim 9, wherein the water recovery device is compact and can be discretely located under the counter or on an adjacent wall alongside the lavatory.

11. The water recovery device according to claim 10, wherein the water recovery device readily lends itself to convenient, organized and unobtrusive installation within a bathroom using standard water piping or tubing along limited distances said piping or tubing being secured in place in straight and plumb lines along the walls between the device and the storage and also between the device and the water source.

12. The water recovery device according to claim 11, wherein the installation can be adapted to various connectors including use of connectors for rigid or flexible tubing, screw-on connections, and annular or knurled slip-on tube connectors.

13. The water recovery device according to claim 11, wherein the water recovery device is adaptable to variations in structure, design and finish as required to match and/or compliment similar structure and design features of products of most bathroom and kitchen fixture manufacturers.

\* \* \* \* \*